Patented Apr. 4, 1950

2,502,868

UNITED STATES PATENT OFFICE 2,502,868

NICOTINYL SALICYLIC ACID

Gustav J. Martin, Philadelphia, and Souren Avakian, Oreland, Pa., assignors to The National Drug Company, Philadelphia, Pa., a corporation of Pennsylvania No Drawing. Application June 19, 1946, Serial No. 677,901

1 Claim. (Cl. 260—295.5)

This invention relates to a new compound which is of especial value as an analgesic and more particularly refers to nicotinyl salicylic acid and a process for its production.

It is an object of this invention to produce a compound having analgesic properties heretofore unattainable. A further object is to produce a compound having the analgesic properties of salicylic acid but which is free from the disadvantages of that compound. A still further object is to produce nicotinyl salicylic acid. Additional objects will become apparent from a consideration of the following description and claim.

These objects are attained in accordance with the present invention wherein nicotinyl salicylic acid is prepared by reacting salicylic acid with a solution of nicotinyl chloride in chloroform.

The invention may be more readily understood by a consideration of the following illustrative example.

Example 31.8 grams of nicotinic acid hydrochloride was refluxed with an excess of thionyl chloride for 3 days. At the end of this period a clear solution was produced. From this solution as much of the thionyl chloride as possible was removed by distillation at 110–115° C./13 mm. The residue was treated carefully with 15.8 grams of dry pyridine and extracted with three 100 cc. portions of chloroform. The extract was added slowly and with shaking to 13.8 grams of salicylic acid dissolved in a mixture of 150 cc. of chloroform and 15 grams of pyridine. A precipitate began to separate after a few minutes. The mixture was allowed to stand for 1 hour, filtered, and the precipitate washed with 300 cc. of boiling absolute ethyl alcohol. The product formed was nicotinyl salicylic acid, which melted at 192–193° C. 12 grams of this product was obtained, equivalent to a yield of 46%.

This product is surprisingly effective as an analgesic since it combines the analgesic properties of salicylic acid with the vasodilator activity of nicotinic acid. Surprisingly enough, however, it does not produce the results of a mixture of nicotinic acid and salicylic acid but possesses characteristics substantially superior to such a mixture. For instance, following a single dosage of this product high blood salicylic acid levels can be maintained for periods of 24 to 36 hours. In contrast therewith, acetyl salicylic acid or a mixture of acetyl salicylic acid and nicotinic acid produces a salicylic acid level in the blood which is maintained for a period of but 4 or 5 hours. As a result, it appears that the properties of nicotinic acid and salicylic acid are not only combined in this compound but are enhanced to a degree far greater than could be attained by employing a mixture of these compounds.

It should be noted that in the preparation of this compound the salicylic acid may be reacted with a crude solution of nicotinyl chloride rather than with the purified compound.

As many apparently widely different embodiments of this invention may be made without departing from the spirit and scope hereof, it is to be understood that the invention is not limited to the specific embodiments hereof except as defined in the appended claim.

We claim:

Nicotinyl salicylic acid.

GUSTAV J. MARTIN.
SOUREN AVAKIAN.

REFERENCES CITED

The following references are of record in the file of this patent:

UNITED STATES PATENTS

| Number | Name | Date |
|---|---|---|
| 1,611,978 | Wolffenstein | Dec. 28, 1926 |

FOREIGN PATENTS

| Number | Country | Date |
|---|---|---|
| 526,258 | Great Britain | 1940 |

OTHER REFERENCES

Meyer, Trav. Chimiqs. de Pay-Bas., p. 326 (1925).

Chem. Abstracts, p. 6657 (1937), vol. 31.

Drug Specialty Formulae by Belanger (1941), p. 127, No. 218.

Badgett, J. American Chem. Soc., pp. 1135–1138. July 1945.